(12) United States Patent
Harrill

(10) Patent No.: US 11,904,814 B2
(45) Date of Patent: Feb. 20, 2024

(54) ACTUATOR FOR PIVOTING BICYCLE RACK

(71) Applicant: Kuat Innovations LLC, Springfield, MO (US)

(72) Inventor: Austin Harrill, Springfield, MO (US)

(73) Assignee: Kuat Innovations LLC, Springfield, MO (US)

( * ) Notice: Subject to any disclaimer, the term of this patent is extended or adjusted under 35 U.S.C. 154(b) by 0 days.

(21) Appl. No.: 17/575,679

(22) Filed: Jan. 14, 2022

(65) Prior Publication Data

US 2022/0134962 A1  May 5, 2022

Related U.S. Application Data

(63) Continuation of application No. 16/787,803, filed on Feb. 11, 2020, now Pat. No. 11,225,199.

(51) Int. Cl.
*B60R 9/10* (2006.01)
*G05G 1/04* (2006.01)
*F16B 7/04* (2006.01)
*G05G 5/04* (2006.01)

(52) U.S. Cl.
CPC .............. *B60R 9/10* (2013.01); *F16B 7/0413* (2013.01); *G05G 1/04* (2013.01); *G05G 5/04* (2013.01); *G05G 2505/00* (2013.01)

(58) Field of Classification Search
CPC .................................................. G05G 2505/00
See application file for complete search history.

(56) References Cited

U.S. PATENT DOCUMENTS

| | | |
|---|---|---|
| 3,655,082 A | 4/1972 | Garrett |
| 5,529,231 A * | 6/1996 | Burgess ................... B60R 9/10 248/592 |
| 5,685,469 A | 11/1997 | Stapleton |
| 5,685,686 A * | 11/1997 | Burns ...................... B60R 9/10 403/374.5 |
| 5,692,659 A | 12/1997 | Reeves |
| 6,401,999 B1 | 6/2002 | Hehr |
| 6,485,243 B1 | 11/2002 | Ferman |
| 7,410,082 B2 | 8/2008 | Stewart |
| 9,956,922 B2 | 5/2018 | Phillips |
| 10,011,237 B1 | 7/2018 | Phillips |
| 10,059,276 B2 | 8/2018 | Phillips |
| 10,384,620 B2 | 8/2019 | Prescott et al. |
| 11,208,167 B2 * | 12/2021 | Kuschmeader .......... B62H 3/12 |
| 11,225,199 B2 * | 1/2022 | Harrill ................... B60R 9/045 |
| 2008/0073395 A1 | 3/2008 | Reeves et al. |

(Continued)

*Primary Examiner* — Vicky A Johnson
(74) *Attorney, Agent, or Firm* — Kutak Rock LLP; James H Jeffries

(57) ABSTRACT

A latch mechanism for a pivoting bicycle rack provides a pivot release actuator on an extension that is added on to the bicycle rack. The latch mechanism comprises a connector body that is attached to the bicycle rack, and that may have an actuator for operating the pivot release. The rack extension assembly has an actuator and a linkage that connects to the connector body in the bicycle rack so that the actuator in the extension can release the pivot on the bicycle rack. The connector body may be shaped to guide the linkage during the process of attaching the extension assembly to the bicycle rack. The mechanism may be provided with a means for disconnecting the linkage from the connector body.

11 Claims, 18 Drawing Sheets

(56) References Cited

U.S. PATENT DOCUMENTS

| | | |
|---|---|---|
| 2008/0099522 A1 | 5/2008 | Clausen et al. |
| 2014/0246467 A1 | 9/2014 | Hein et al. |
| 2015/0021371 A1 | 1/2015 | Ward et al. |
| 2016/0068110 A1 | 3/2016 | Prescott et al. |
| 2018/0244208 A1* | 8/2018 | Willis .................. B60R 9/0423 |
| 2020/0023787 A1 | 1/2020 | Prescott et al. |

* cited by examiner

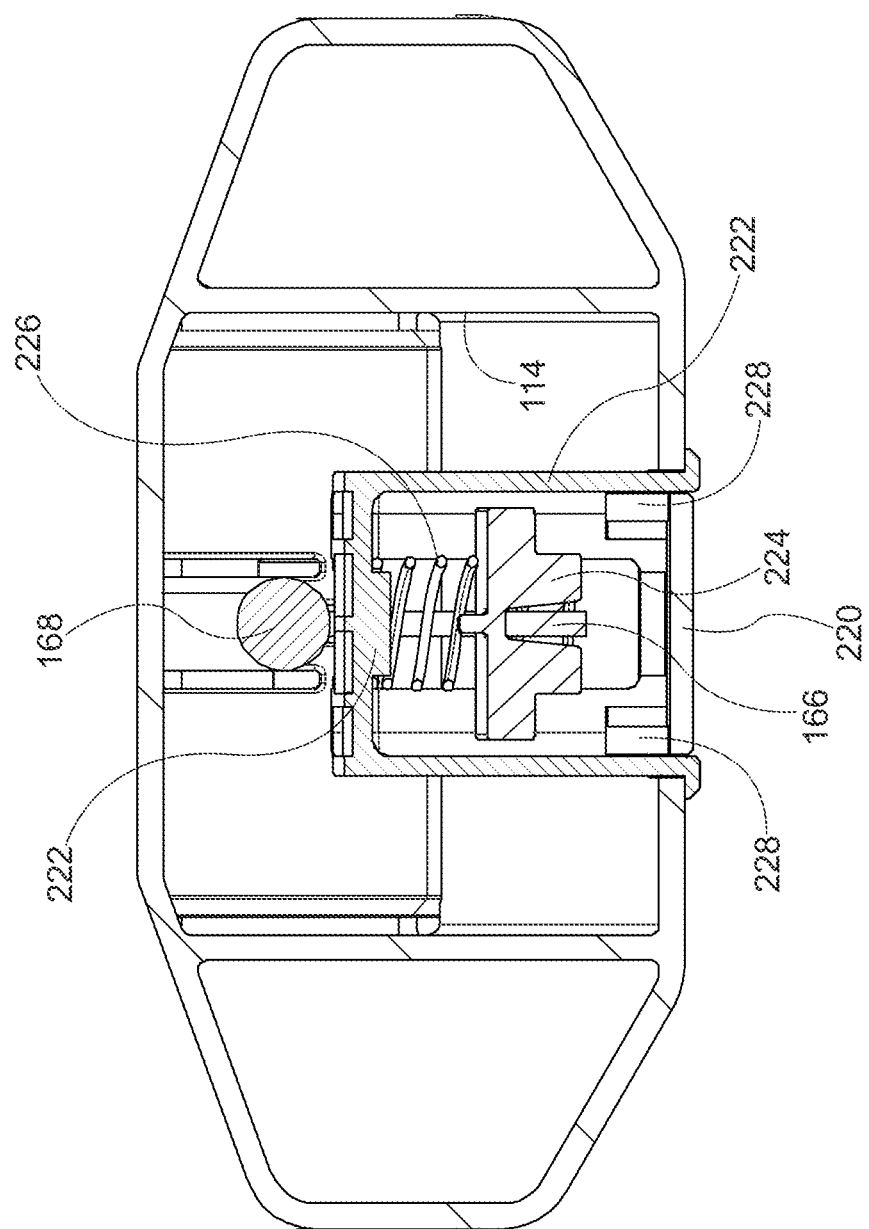

ACTUATOR FOR PIVOTING BICYCLE RACK

CROSS-REFERENCE TO RELATED APPLICATIONS

This application claims the benefit and is a continuation of U.S. patent application Ser. No. 16/787,803 filed Feb. 11, 2020, the disclosure of which is incorporated herein by reference.

BACKGROUND

Field of the Invention

This disclosure is in the field of equipment racks. More specifically, this disclosure is in the field of equipment racks used with vehicles, namely, for racks used to carry equipment such as bicycles, kayaks, or other cargo on a vehicle. As will be described below, this disclosure also relates to equipment racks that are extendable and that pivot from an operational configuration to a stowed configuration, and vice versa.

SUMMARY OF THE INVENTION

In various embodiments, the improvement to bicycle racks comprises an actuator mechanism for an equipment rack comprising a rack assembly, a pivotal mechanism in the rack assembly, and an extension assembly removably attachable to the rack assembly. The actuator mechanism comprises a connector body movably attached to the rack assembly for actuating the pivotal mechanism in the rack assembly, an extension actuator movably attached to the extension assembly, a linkage attached at a distal point to the extension actuator, and a linkage catch attached to the linkage at its proximal end. The connector body has an extension catch receptacle for receiving the linkage catch, and attachment of the extension assembly to the rack assembly connects the linkage catch to the extension catch receptacle.

In some embodiments the extension catch receptacle is a catch detent for receiving the linkage catch. In other embodiments the extension catch receptacle has one or more catch plates with sloped edges that guide the linkage catch into the catch detent while the extension assembly is attached to the bicycle rack. In some embodiments the connector body has a channel for guiding the linkage catch into the catch detent while the extension assembly is being attached to the bicycle rack.

The actuator mechanism may have a biasing mechanism that applies a biasing force to the linkage to hold the linkage catch in the catch detent. Some embodiments of the actuator mechanism have a release actuator to disengage the linkage catch from the catch detent.

Other embodiments of the latch mechanism are used with a bicycle rack comprising a support member, a vehicle attachment member, a pivoting mechanism, and an extension assembly removably attached to the support member. In these embodiments the latch mechanism may comprise a connector body movably attached to the support member, wherein movement of the connector body unlatches the pivoting mechanism; an extension actuator movably attached to the extension assembly; a linkage arm connected to the extension actuator and extending to the proximal end of the extension assembly; wherein when the extension assembly is attached to the support member the linkage arm releasably connects to the connector body; and wherein the connector body is shaped to guide a proximal end of the linkage arm into the releasable connection.

BRIEF DESCRIPTION OF THE DRAWINGS

FIG. 9D is a cross-sectional view of a portion of an embodiment of a bicycle rack with the inventive actuator and a removable extension assembly attached thereto.

DETAILED DESCRIPTION

Many equipment racks for vehicles are available that pivot from an operational position to a stowed position. In the operational position they may support bicycles, cargo, or other equipment for transport on the vehicle. When not in use to carry such equipment, they may be pivoted to a stowed configuration. This is advantageous for a variety of reasons, such as reducing the chance of damage to the rack or the vehicle by collision, reduce the amount of space taken up by the vehicle, and for other reasons.

Figure 1A:
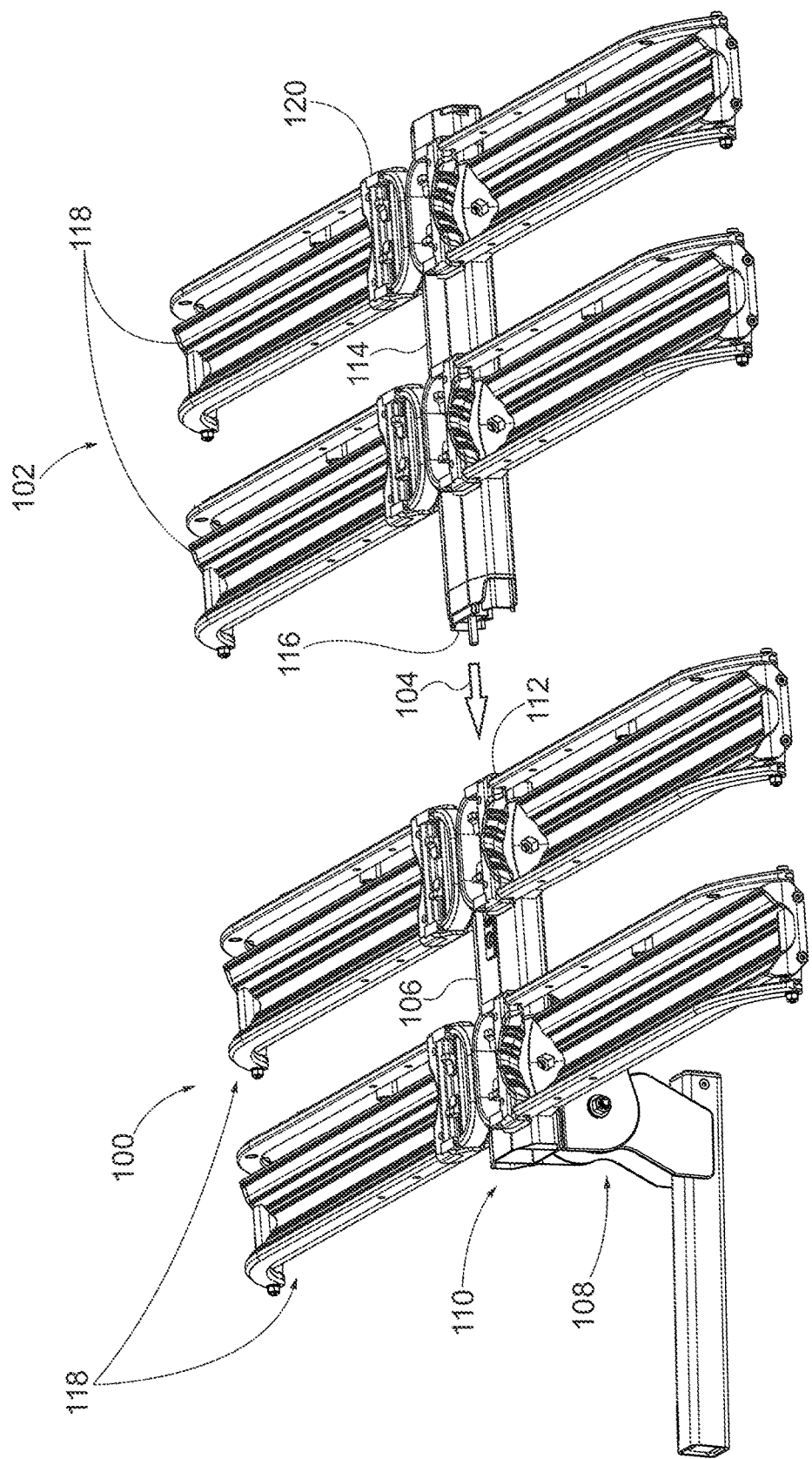
FIG. 1A is a perspective view of an embodiment of a bicycle rack in an operational configuration with the inventive actuator and a detached, removable extension assembly adjacent thereto.

Typically, these pivoting equipment racks are provided with a pivot mechanism that latches securely in one or more desired positions. These positions may include the stowed configuration, the operational configuration, or other relative positions of the parts of the equipment rack. For example, a rack 100 is depicted in FIG. 1A in an operational configuration, and in a stowed configuration in FIG. 1C. In this rack assembly 100, the drawbar that attaches to the vehicle has a pivotal mechanism 108 that in turn supports the other components of the bicycle rack 100. The depicted drawbar may be any other type of device for attachment of the rack to a vehicle, trailer, or structure of any kind. Such attachment mechanisms may be referred to herein as the vehicle attachment member. For ease and safety of use, it is necessary to provide an actuator that latches the pivoting mechanism in the desired positions to prevent undesired movement of the parts of the rack assembly 100. It may be desired to provide an actuator for the latch mechanism at a position on the rack assembly 100 that is spaced apart from the pivotal mechanism 108.

Figure 1B:
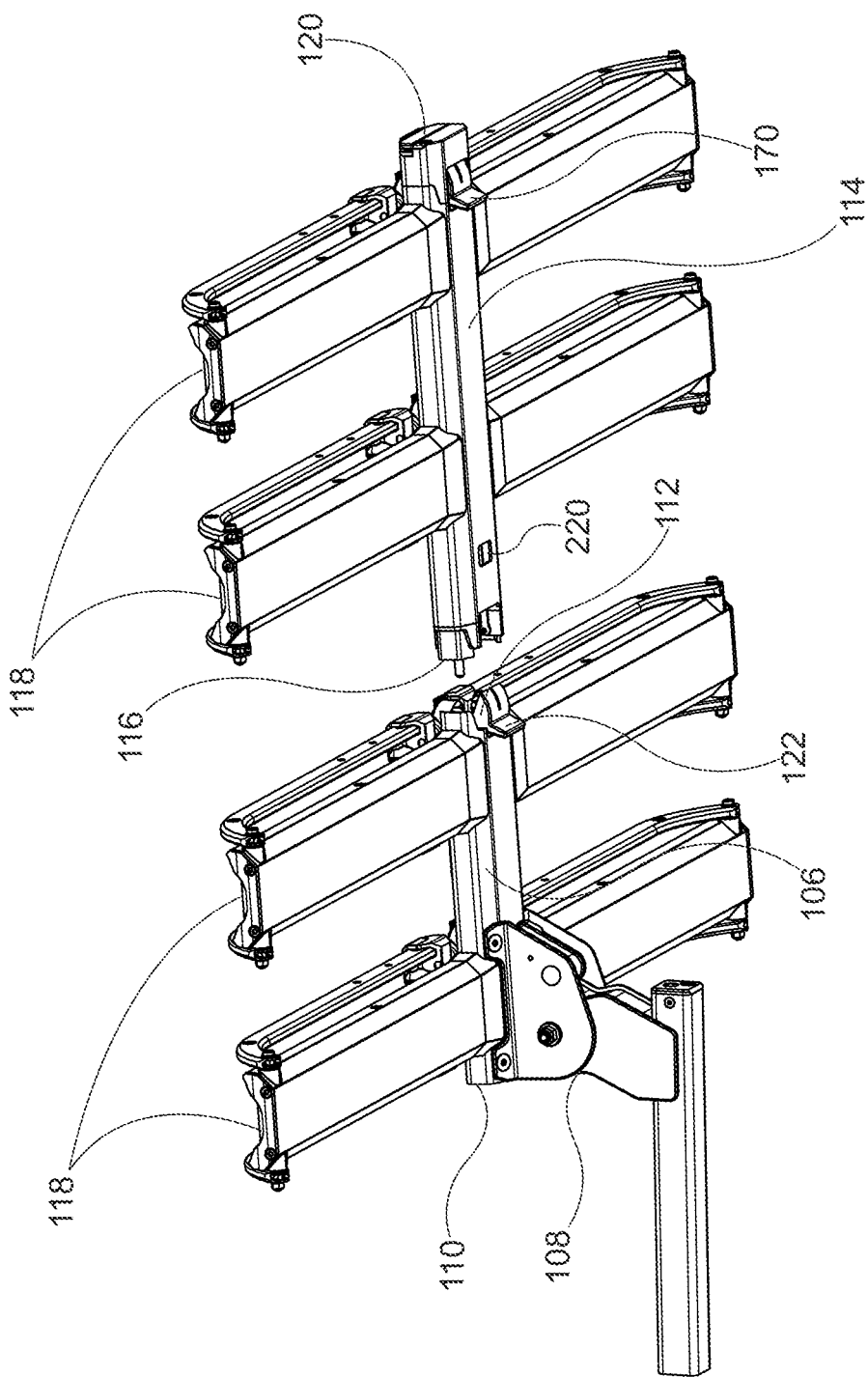
FIG. 1B is a perspective view of an embodiment of a bicycle rack in an operational configuration with the inventive actuator and a detached, removable extension assembly adjacent thereto.
Figure 1C:
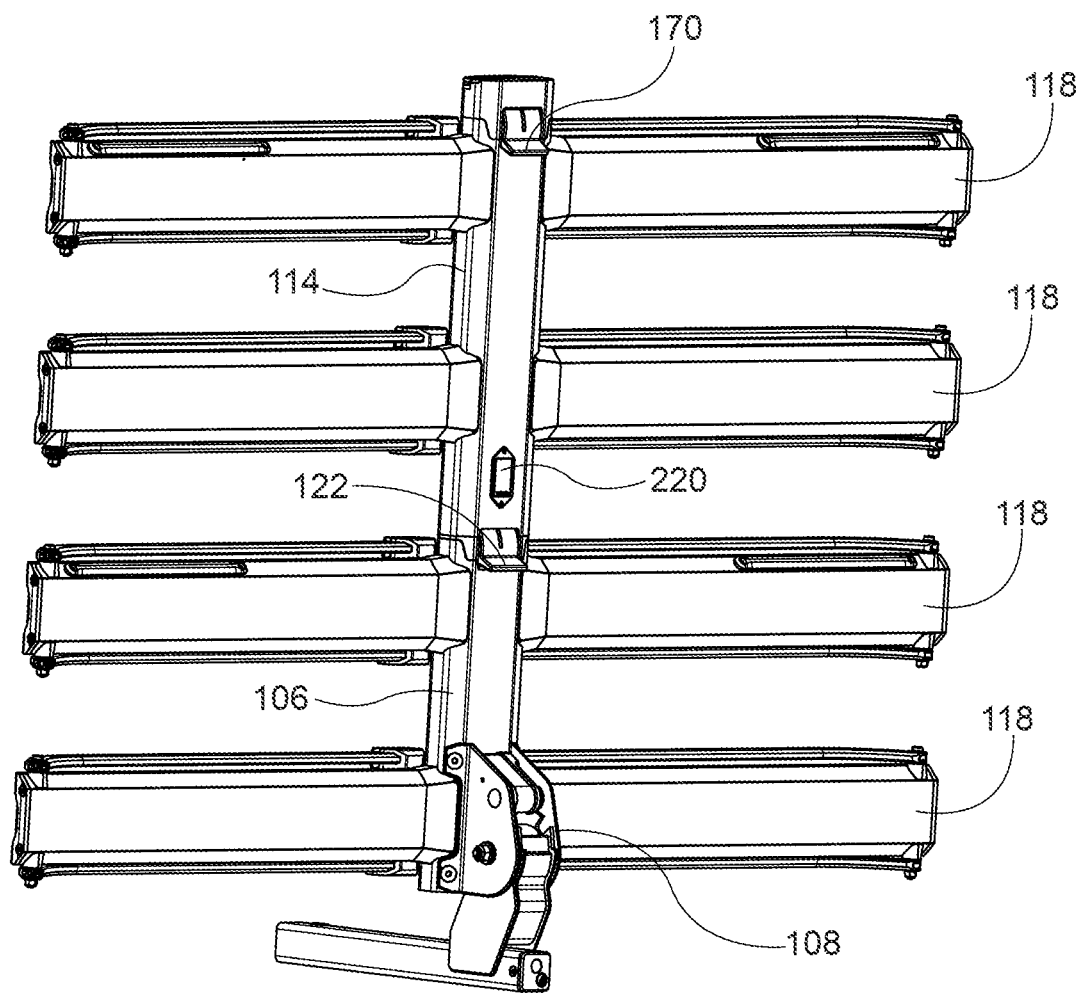
FIG. 1C is a perspective view of an embodiment of a bicycle rack in a stowed configuration with the inventive actuator, and an attached, removable extension assembly.

Many of these equipment racks are also provided with removable extension assemblies 102 such as shown in FIGS. 1A and 1C. These extension assemblies 102 allow the rack assembly 100 to be expanded to support more equipment. In the depicted embodiment, a rack assembly with support for two bicycles may be extended to support four bicycles. It is desirable to have a quick and easy method for interconnecting the extension assembly 102 onto the rack assembly 100. It is also desirable to have an actuator on the extension assembly 102 that is able to release or engage the pivotal mechanism 108. This may be necessary because the extension assembly 102 may make it difficult or inconvenient to reach the actuator on the rack assembly 100.

Referring again to FIG. 1A, a perspective view of an embodiment of a bicycle rack assembly 100 with a removeable extension assembly 102 is depicted. In the depicted embodiment, the rack 100 has supports 118 to hold two bicycles. Many bicycle racks such as rack assembly 100 are provided with fixtures to hold one or more bicycles such as bicycle support members 118. The exact type of bicycle support member 118 or method of attachment of a bicycle to the rack assembly 100 is not limiting of the claimed invention.

Some of these rack assemblies 100 may accept extensions such as the extension assembly 102 that attach to the distal end of the rack assembly 100 so that it may be temporarily expanded to support additional bicycles or additional equipment of various kinds. In the version depicted in FIG. 1A, the extension assembly 102 provides support for two additional bicycles. The exact mechanism of attaching or supporting the bicycles on the rack 100 and extension 102 is not limiting of the scope of the inventive devices described herein. In varying embodiments, the bicycles may hang from, stand on, or be otherwise attached to the rack 100. Similarly, the device described and claimed herein may be used for racks for other types of equipment as well such as cargo containers, skis, kayaks, luggage, and others. In FIG. 1A the arrow 104 depicts the movement of extension assembly 102 to connect it to the end of rack assembly 102. In varying embodiments, different mechanisms of attachment may be used to connect the extension assembly 102 to the rack assembly 100 without limiting the generality of the claimed inventive actuator.

Often these bicycle rack assemblies 100 are provided with a pivoting mechanism 108 to allow the rack assembly 100 to be reconfigured by pivoting the support member 106 from the horizontal (or operational) position shown in FIG. 1A to a vertical (or stowed) position shown in FIG. 1C. In the depicted rack, the proximal end 110 of a support member 106 is attached to the pivotal attachment 108. The pivotal mechanism 108 typically has a latching mechanism to secure the support member 106 in certain desired positions with respect to the pivotal attachment 108, such as a substantially horizontal, operational position like that shown in FIG. 1A or a substantially vertical, stowed position. An actuator of varying types may be provided to allow a user to release the latching mechanism so that the support member 106 may be released from one position and secured in another desired position.

When a rack extension assembly 102 is attached to the rack assembly 100 at the distal end 112 of support member 106, it may become difficult or inconvenient to access the actuator on rack assembly 100. Thus, it is desirable to provide an actuator on the extension assembly 102 by which a user may release the latching mechanism of pivotal attachment 108. It is also desirable for the actuator on extension assembly 102 to connect to the latching mechanism on pivotal attachment 108 without requiring additional assembly steps when adding or removing the extension assembly 102 from rack assembly 100. Thus, it is desirable for the actuator on the extension assembly 102 to automatically connect to the latching mechanism for pivotal attachment 108 when the extension assembly 102 is attached to rack assembly 100. In some embodiments of the mechanism, the connection of the latching mechanism may comprise a second step of actuating the mechanism to complete the connection, such as by pivoting the actuator body 150 to engage the extension linkage arm.

Various embodiments of the inventive assembly that is described and claimed herein provide an actuator on extension assembly 102 for releasing a latching mechanism in pivotal attachment 108. Neither the latching mechanism in pivotal attachment 108 nor the method of attaching extension assembly 102 to rack assembly 100 are limiting of the scope of the inventive mechanism. As shown in FIG. 1A, the extension assembly 102 may be simply moved in the direction of arrow 104 to engage the rack 100. In this depiction the proximal end 116 of the extension support member 114 engages the distal end 112 of the support member 106. The inventive mechanism also may be used on racks and extension that require some pivoting of the extension assembly 102 as it is installed onto rack assembly 100.

Referring now to FIG. 1B, a perspective view of the bottom of the rack assembly 100 in the operational position is depicted. In the depicted embodiment, the actuator 122 allows a user to release the latching mechanism of the pivotal attachment 108. In this embodiment the actuators for the release mechanism are on the bottom of the support members 106 and 114, however in other embodiments they may be on the side, bottom, or ends of the support members 106 or 114, or on other components of the assemblies 100 or 102. The exact location of the actuator 122 is not limiting of the claimed invention. In some embodiments of the device, actuator 122 may not be present at all. Similarly, the depicted rack extension assembly 102 is provided with an actuator 170 near the distal end 120 of the extension support member 114. This actuator 170 may also be moved from the location shown in FIG. 1B and need not be in the same position as actuator 122 with respect to the support member 114. In some embodiments, a disengagement mechanism 220 may be provided to disengage the actuator 170 from the actuator 122 when the user desires to remove the extension assembly 102 from the rack assembly 100.

Figure 2:
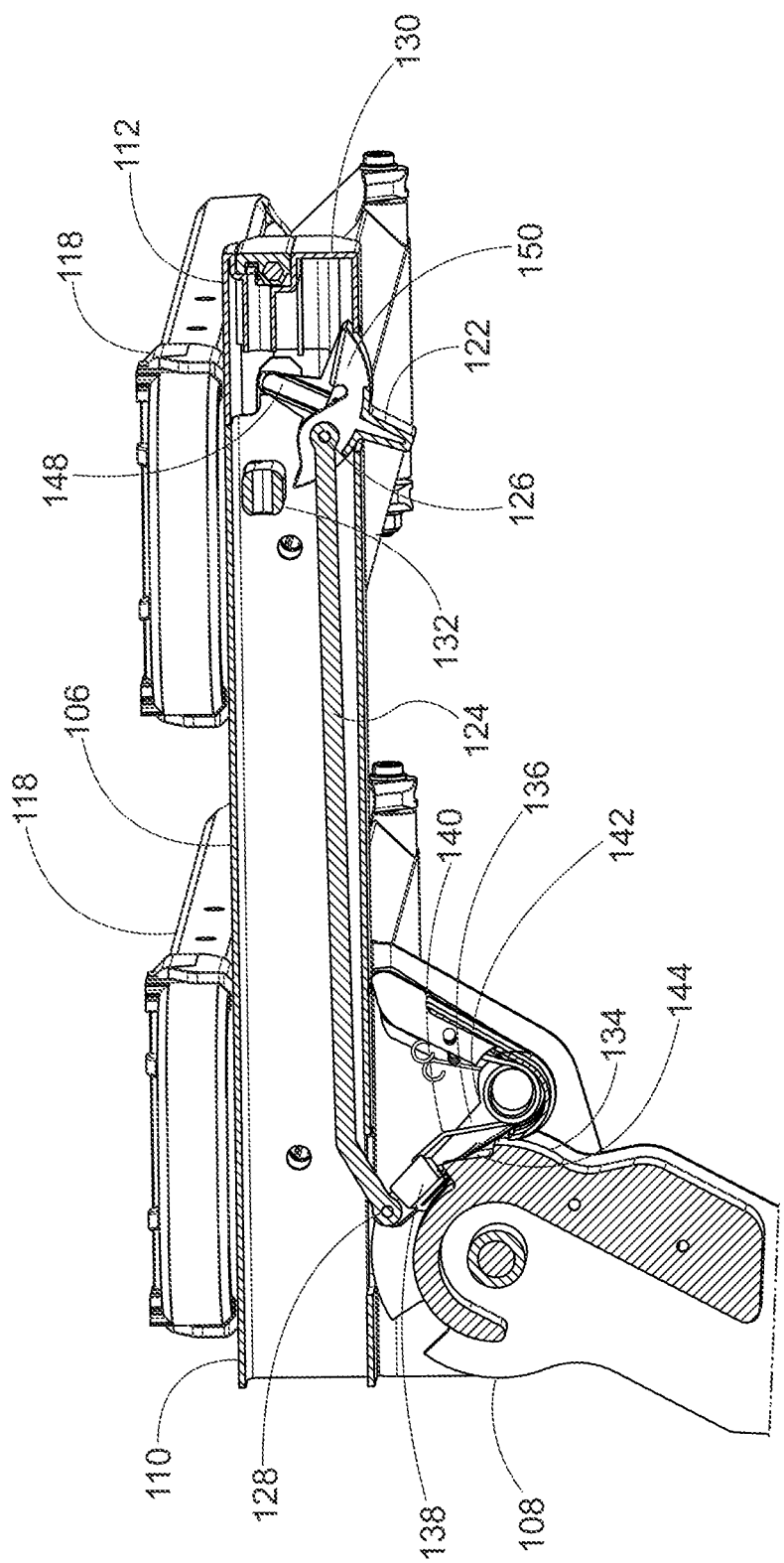
FIG. 2 is a cross-sectional view of an embodiment of a bicycle rack with the inventive actuator.

Referring now to FIG. 2, a cross-sectional view of a rack assembly 100 incorporating an embodiment of the inventive mechanism is depicted. The rack assembly 100 is provided with a pivotal attachment 108 with a latching mechanism incorporated therein. The details of the latching mechanism are not limiting of the scope of the inventive mechanism but are shown as an example of a pivotal attachment. In the depicted rack 100, the pivotal attachment has a hub 134 with one or more latch detent 144 features. A latch element 136 pivots at the pivot end 142 and engages the latch detent 144 at the latch cross bar 138. A linkage 124 pivotally or flexibly attaches to the latch element 136 at a proximal end 128 thereof. Linear translation of the linkage 124 toward the distal end of the support member 106 lifts the bar 138 out of the detent 144 so that the support member 106 may be pivoted with respect to the hub 134. A bias spring 140 may be provided to return the latch cross bar 138 to the latched position when the actuator is not held back by a user. Any other mechanism for pivotal attachment 108 may be utilized with the inventive release mechanism claimed herein.

Linkage 124 extends from the pivotal attachment 108 toward the distal end 112 of support member 106. In a preferred embodiment, the linkage 124 is inside a cavity inside the support member 106, however in some embodiments it may be all or partially outside the support member 106. The distal end 126 of linkage 124 is connected to connector body 150. In a preferred embodiment, the linkage 124 is pivotally attached to the connector body 150 by a pivot pin or similar device, however in other embodiments the attachment may be rigid or semi-rigid.

The connector body 150 may be disposed near the distal end 112 of the support member 106. As will be described in detail with respect to later figures, the connector body 150 provides for the quick connection to and disconnection from an actuator 170 disposed in rack extension assembly 102 when the rack extension assembly 102 is attached to or detached from the rack assembly 100. When connector body 150 is connected to an actuator 170 on the rack extension 102, it is translated by movement of that actuator and communicates that movement to the linkage 124. The connector body 150 may be completely inside, partially inside, or completely outside of a cavity inside the support member 106.

The depicted connector body 150 is pivotally attached to the support member by one or more pivot pins or arms 148, however in other embodiments the connector body 150 may be attached to the support member 106 in a manner that allows linear or arcuate translation. In some embodiments, an optional actuator handle 146 is attached to the connector body 150 so that a user may move the connector body 150 by applying force to the handle 146 sufficient to pivot the connector body around pivot pins or arms 148 toward the distal end of the rack assembly 100. This movement pulls linkage 124 and releases the latching mechanism in pivotal mechanism 108. The actuator handle 122 may protruded outwardly from the connector body 150 or be an opening or cavity in the connector body 150 that a user inserts a finger or a tool into for applying a force to the connector body 150.

In some embodiments the latching mechanism may have a separate actuator (such as a foot pedal near pivotal mechanism 108) on the rack assembly 100 for releasing the latch mechanism in the pivotal attachment 108. An optional, removable end cap 130 may be provided to cover the end of support member 106. When a user desires to add the extension assembly 102, the end cap 130 may be removed and reinstalled later when the extension assembly 102 is removed. The end cap 130 does not have a function with respect to the operation of the inventive mechanism.

In the depicted embodiment, an attachment member 132 is provided in or as part of support member 106. This attachment member 132 provides the mechanism for securing the extension assembly 102 to the rack assembly 100 in the depicted embodiment but is not limiting of the scope of the claims. In this embodiment consists of a crossbar member secured inside the support member 106. The attachment member 132 is provided with a threaded hole or aperture 184 that receives a threaded section 178 of the bolt 168 in extension assembly 102. Tightening the bolt 168 in the threaded aperture 184 pulls the proximal end 116 of extension support member 114 against the distal end 112 of support member 106. Other methods of securing the two assemblies 100 and 102 together may be used without departing from the scope of the inventive mechanism.

Figure 3:
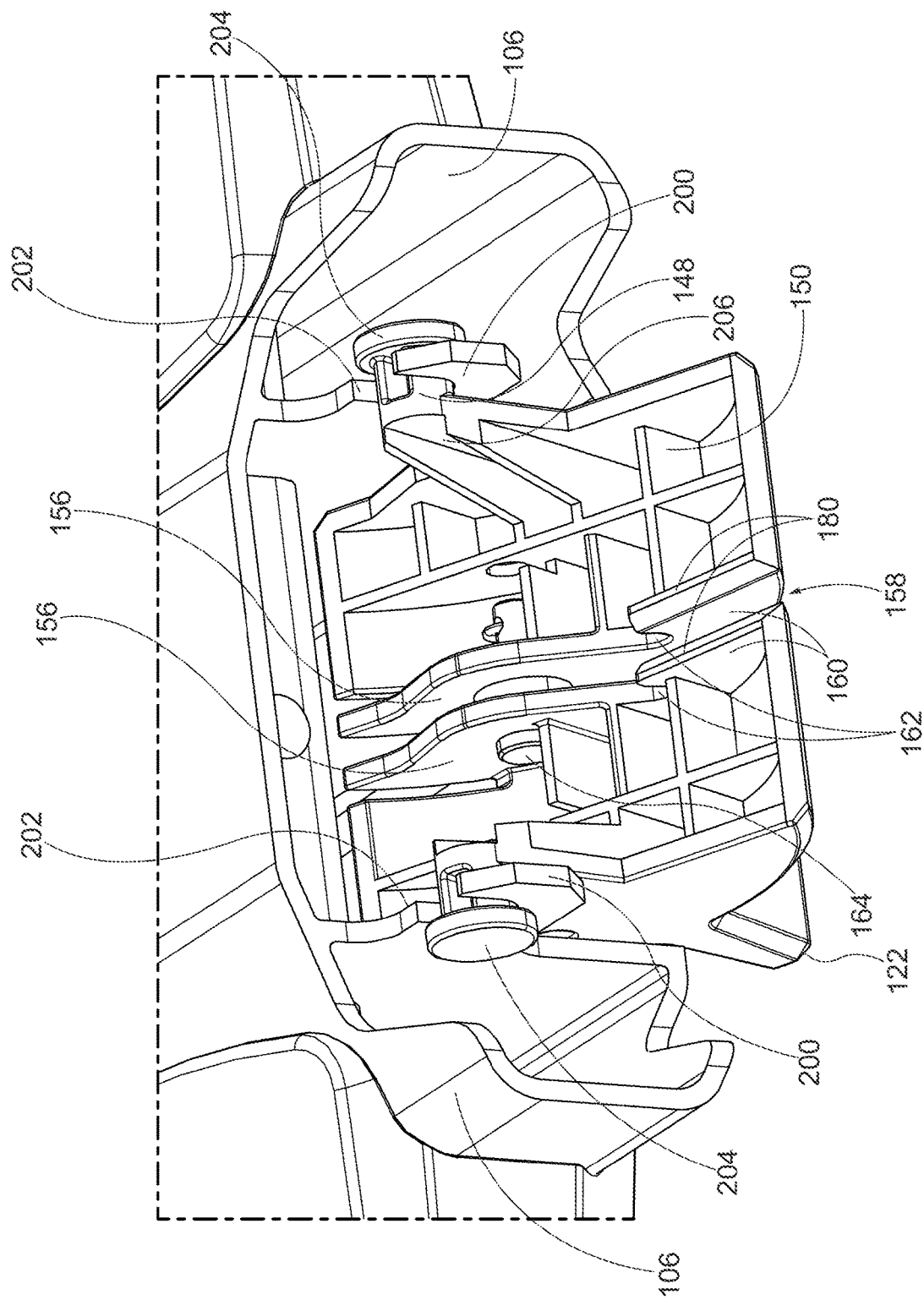
FIG. 3 is a detail, cut-away view of an embodiment of a bicycle rack with the inventive actuator.

FIG. 3 depicts a detail view of an embodiment of the connector body 150 with end cap 130 removed. The depicted embodiment of the connector body 150 is supported by features of the support member 106, such as support plates 200 with notches 202 for receiving the pivot pins 148 on the ends of arms 206. The end of pivot pins 148 may be provided with end cap or flanges 204 to hold them in place in notches 202. This connector body 150 is provided with plates 156 with apertures for a pin 164. The distal end 126 of linkage 124 may be pivotally attached to the pin 164 between the plates 156.

On the other side of the connector body 150, an extension catch receptacle 158 is provided for capturing a proximal end of an extension linkage arm 166. The depicted embodiment of the catch 158 comprises catch plates 160 with sloping edges 180 that guide a catch pin 182 on the proximal end 172 of the extension linkage 166 into the catch detents 162 located at the inner end of the catch plates 160 while the extension assembly is being attached to the bicycle rack. In some embodiments the catch plates 160 form a channel that guides the extension linkage 166 into the catch detent during the attachment process. In some versions the catch plates 160 may be replaced with a plate having a groove provided in the connector body 150 to guide the extension linkage 166. In other embodiments other features may be utilized to guide the linkage 124 into the correct position as the extension assembly 102 is attached to assembly 100. In some embodiments the user may still need to provide some manual alignment of the linkage 124 and the actuator body 150 to ensure correct alignment.

Figure 4A:
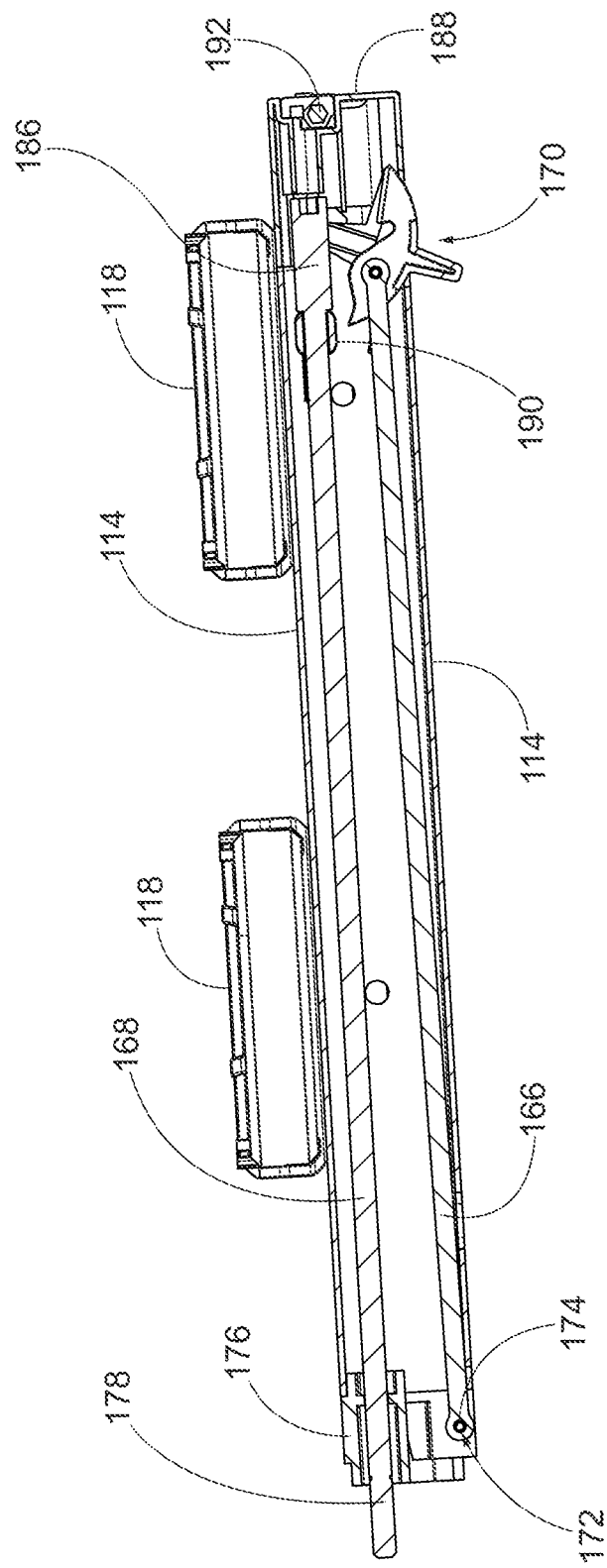
FIG. 4A is a cross-sectional view of an embodiment of a removable extension for a bicycle rack with the inventive actuator.

FIG. 4A depicts an embodiment of the extension assembly 102 that connects to the depicted rack assembly 100. The support member 114 has an interior cavity to allow the bolt 168 and linkage arm 166 to extend along its length. In some embodiments these internal elements may not extend along the entire length of the extension assembly 102, but only a portion. Bolt 168 may only be threaded along a necessary portion 178 to allow it to engage the threaded aperture 184 in bolt attachment member 132. The bolt 168 is otherwise held by unthreaded apertures such as in cross member 190 or end cap 176 to allow it to pivot while floating in the extension assembly until the threaded portion 178 engages cross member 132. Once engaged in cross member 132, the bolt head 186 will exert a force on cross member 190 that secures extension assembly 102 onto rack assembly 100.

The linkage arm 166 extends from a proximal end of the extension assembly 102. The proximal end 172 of linkage 166 has catch pin 182 formed as part of the linkage 166 or as a pin inserted transversely in an aperture 174 in the linkage 166. In the depicted embodiment the catch pin 182 is a transverse pin that extends to the side of the linkage 166. In other embodiments it may be a hook shaped member on the end of the linkage 166, or other shape suitably adapted to slide up the channel or groove into the catch detent and be retained there during use. The catch pin or other similar element on the proximal end of the linkage 166 comprise a releasable connection between the actuator 170 and the connector body 150 that cause movement of the actuator 170 to be translated to the connector body 150.

The distal end 194 of the extension linkage arm 166 may be attached to an actuator body 170. The actuator body 170 may also be pivotally or slidably attached to the extension assembly 102. The actuator body 170 may be identical to the connector body 150 although it need not have the catch plates unless additional extensions may be added on to it.

Figure 4B:
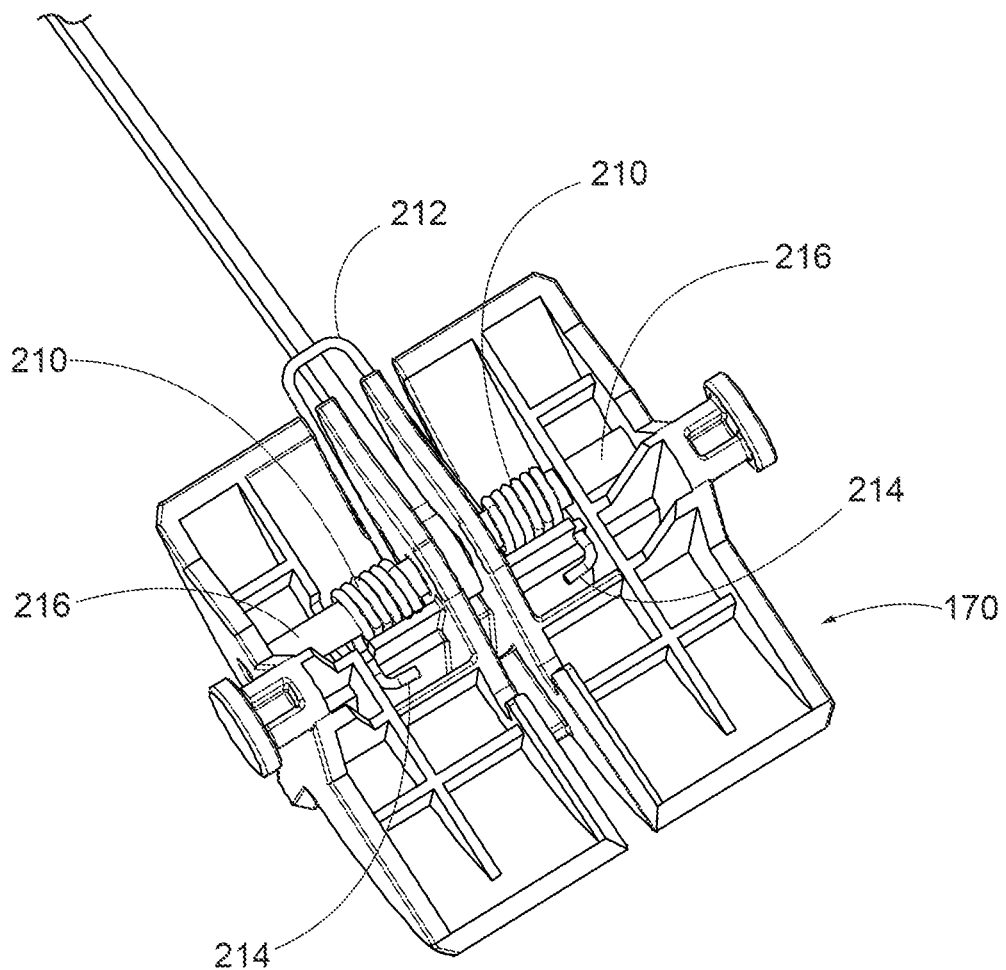
FIG. 4B is a detail view of certain components of an embodiment of a removable extension for a bicycle rack with the inventive actuator.

In the depicted embodiment of the actuator body 170, shown most clearly in FIG. 4B, the linkage arm 166 is pivotally attached to the actuator body 170 by a pin 216. In some embodiments a biasing mechanism may be provided to hold the linkage arm 166 and the actuator body 170 in the positions shown in FIG. 4A when the device is not attached to the assembly 100. These positions are preferred for automatic engagement of the actuators when the extension assembly 102 is attached to the rack assembly 100. In this embodiment the biasing mechanism comprises a spring disposed around the pin 216. This pin may extend to the sides of the bracket plates so that spring coils 210 may be disposed around it to bias the actuator body 170 toward the latched position as shown in FIG. 4A. The depicted version of the biasing mechanism utilizes a first spring arm 212 to push linkage 166 toward the position shown in FIG. 4A while simultaneously using second spring arms 214 to rotate actuator body 170 toward the position shown in that figure. In other embodiments of the mechanism, the linkage arm 166 may have one or more ratchet teeth to engage a pawl on the actuator body 150, or vice versa.

Figure 5:
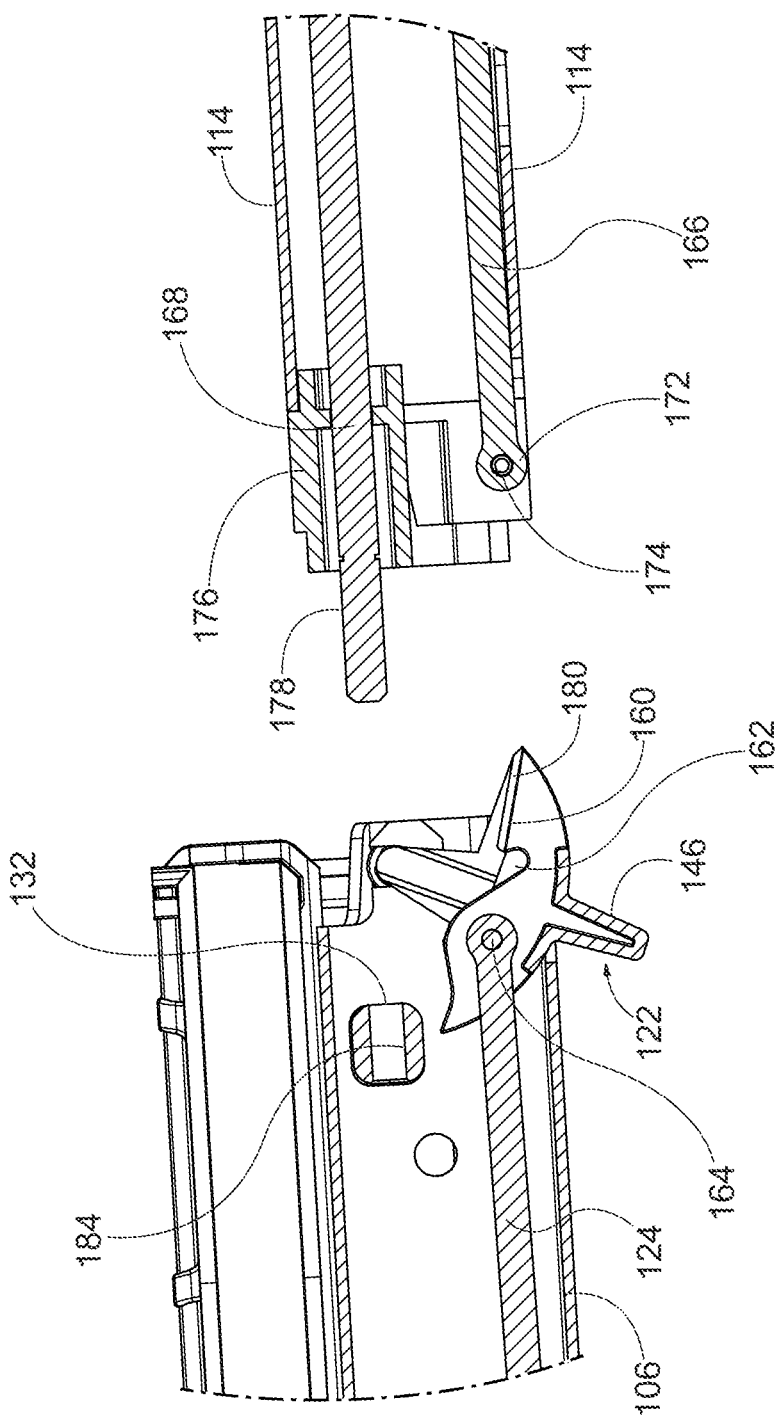
FIG. 5 is a detail, cross-sectional view of a portion of an embodiment of a bicycle rack with the inventive actuator and a detached, removable extension assembly adjacent thereto.
Figure 6A:
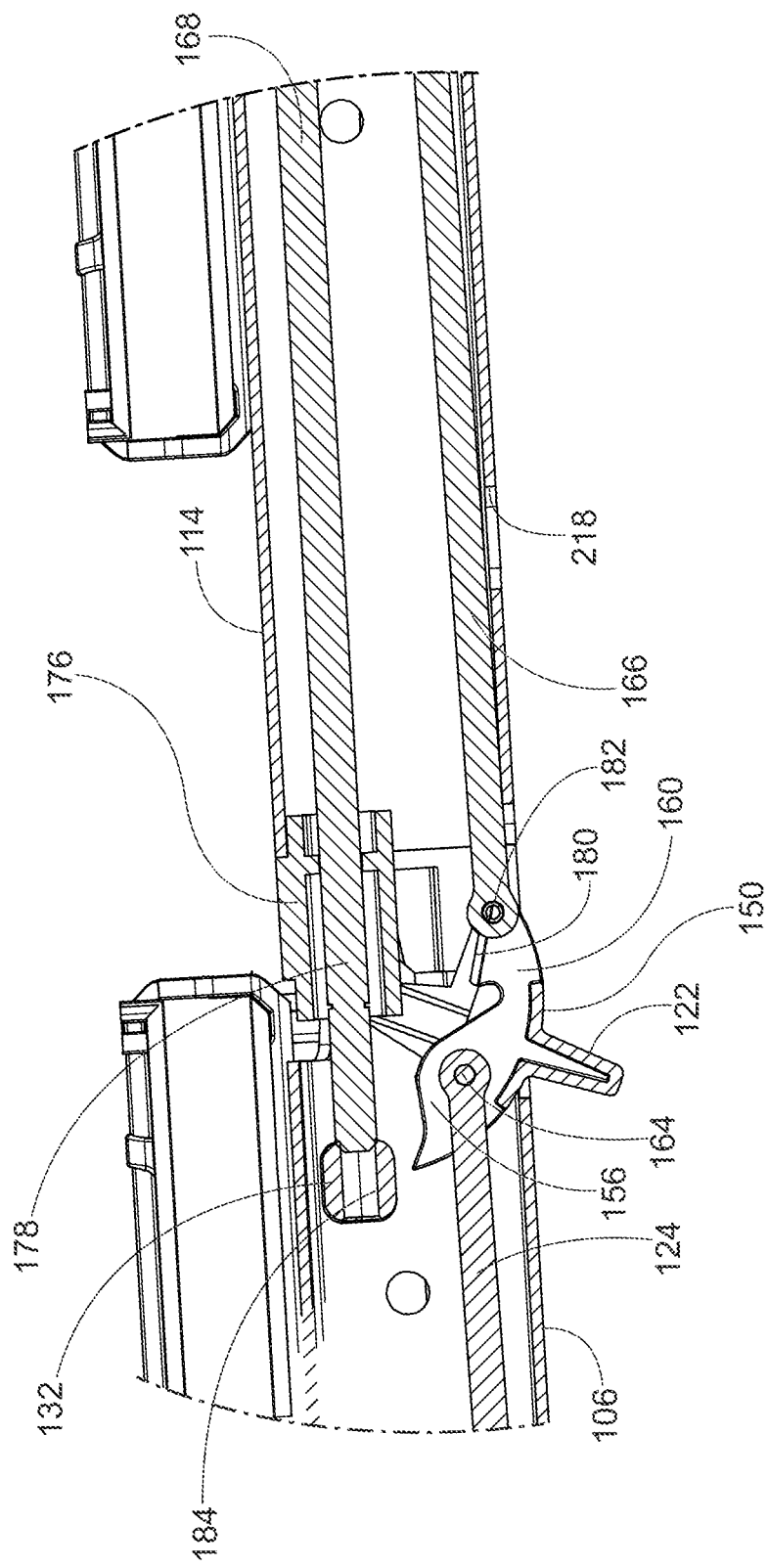
FIG. 6A is a detail, cross-sectional view of a portion of an embodiment of a bicycle rack with the inventive actuator and a detached, removable extension assembly partially attached thereto.
Figure 6B:
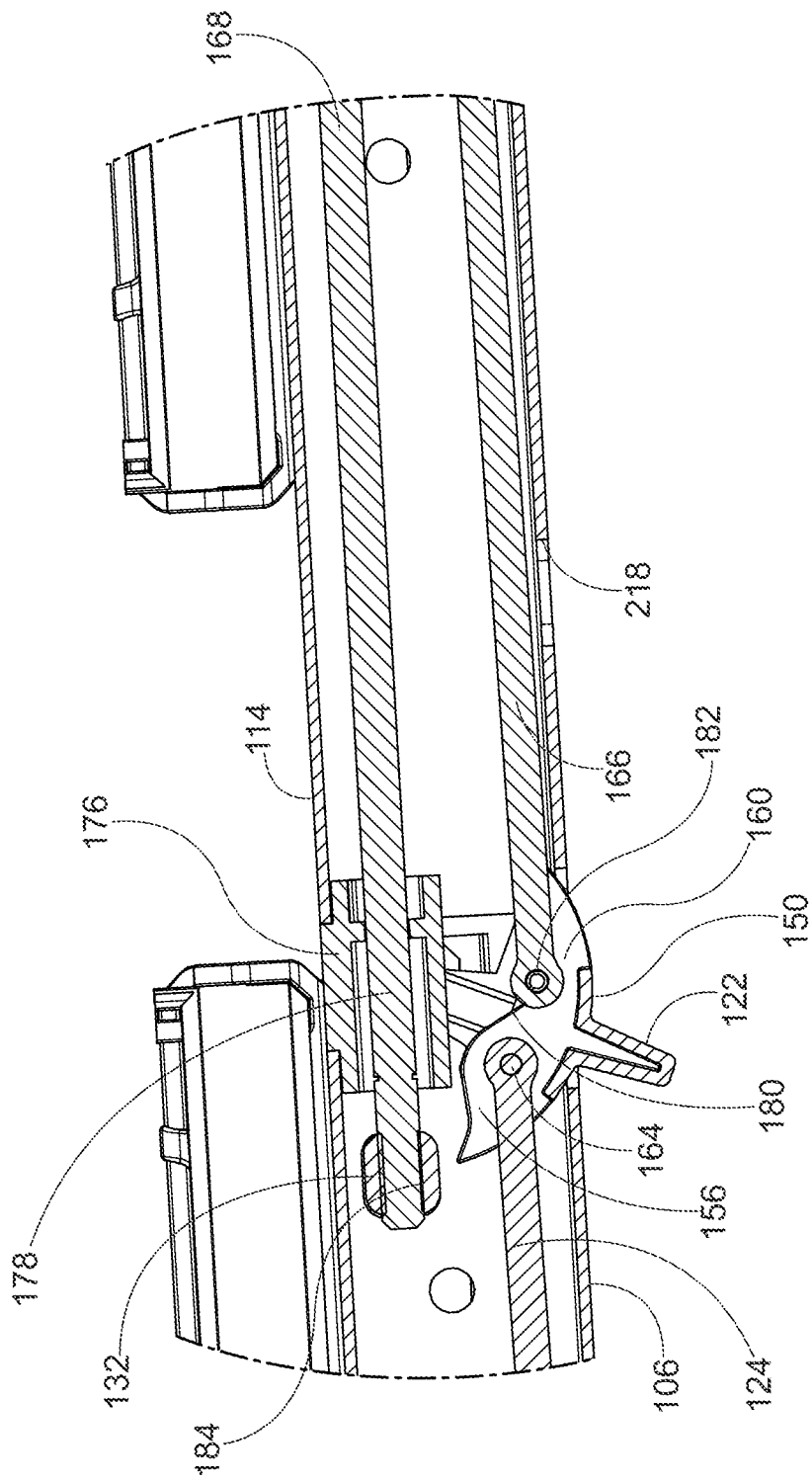
FIG. 6B is a detail, cross-sectional view of a portion of an embodiment of a bicycle rack with the inventive actuator and a detached, removable extension assembly attached thereto.

FIGS. 5, 6A, and 6B depict several points in the process of installing an extension assembly 102 onto the rack assembly 100 with the inventive actuator mechanism. In FIG. 5, the optional end cap 130 has been removed from the support member 106 so that the components of the assemblies 100 and 102 can be connected together. The assemblies are aligned so that the threaded section 178 of bolt 168 will connect with the threaded aperture 184 in cross member 132. Similarly, the proximal end 174 of linkage arm 166 is disposed in alignment with the extension catch receptacle 158 on connector body 150.

Figure 7A:
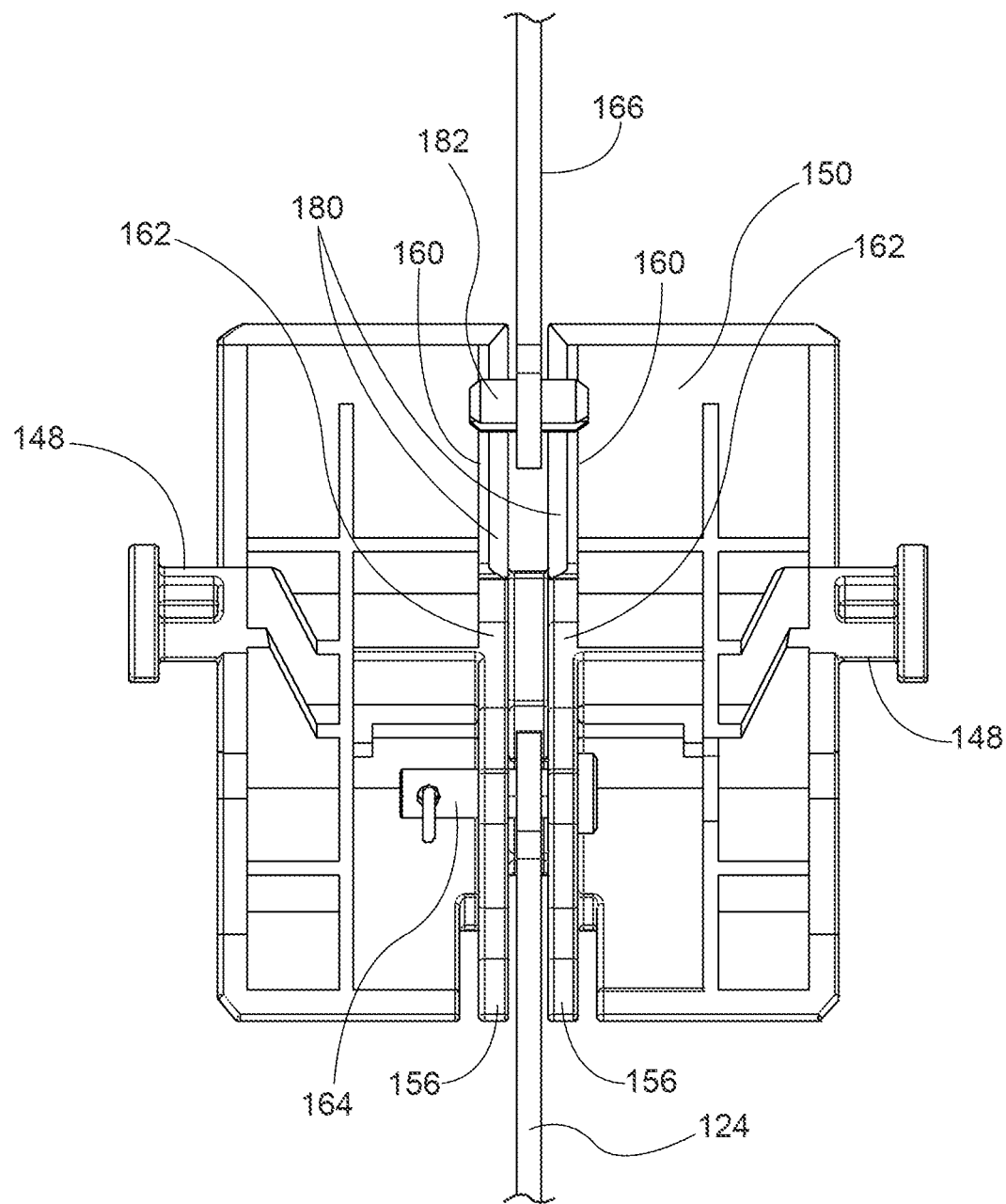
FIG. 7A is a detail view of certain components of an embodiment of the inventive actuator in a partially attached position.

In some embodiments, the extension assembly is translated or moved toward the rack assembly 100 the threaded section 178 of the bolt 168 begins to engage the threaded aperture 132 as shown in FIG. 6A. The proximal end 174 of the linkage arm 166 is positioned between the catch plates 160 and the catch pin 182 slides along the sloped edges 180 of the catch plates 160 toward the catch detent 162. In embodiments of the actuator mechanism with the biasing mechanism in the extension assembly 102, the force applied by the biasing mechanism holds the linkage arm 166 in the extension catch receptacle 158 will the assemblies 100 and 102 are being connected to each other. A view of the linkage arms 124 and 166 and the connector body 150 in this configuration, with other components removed for clarity, is depicted in FIG. 7A.

Figure 7B:
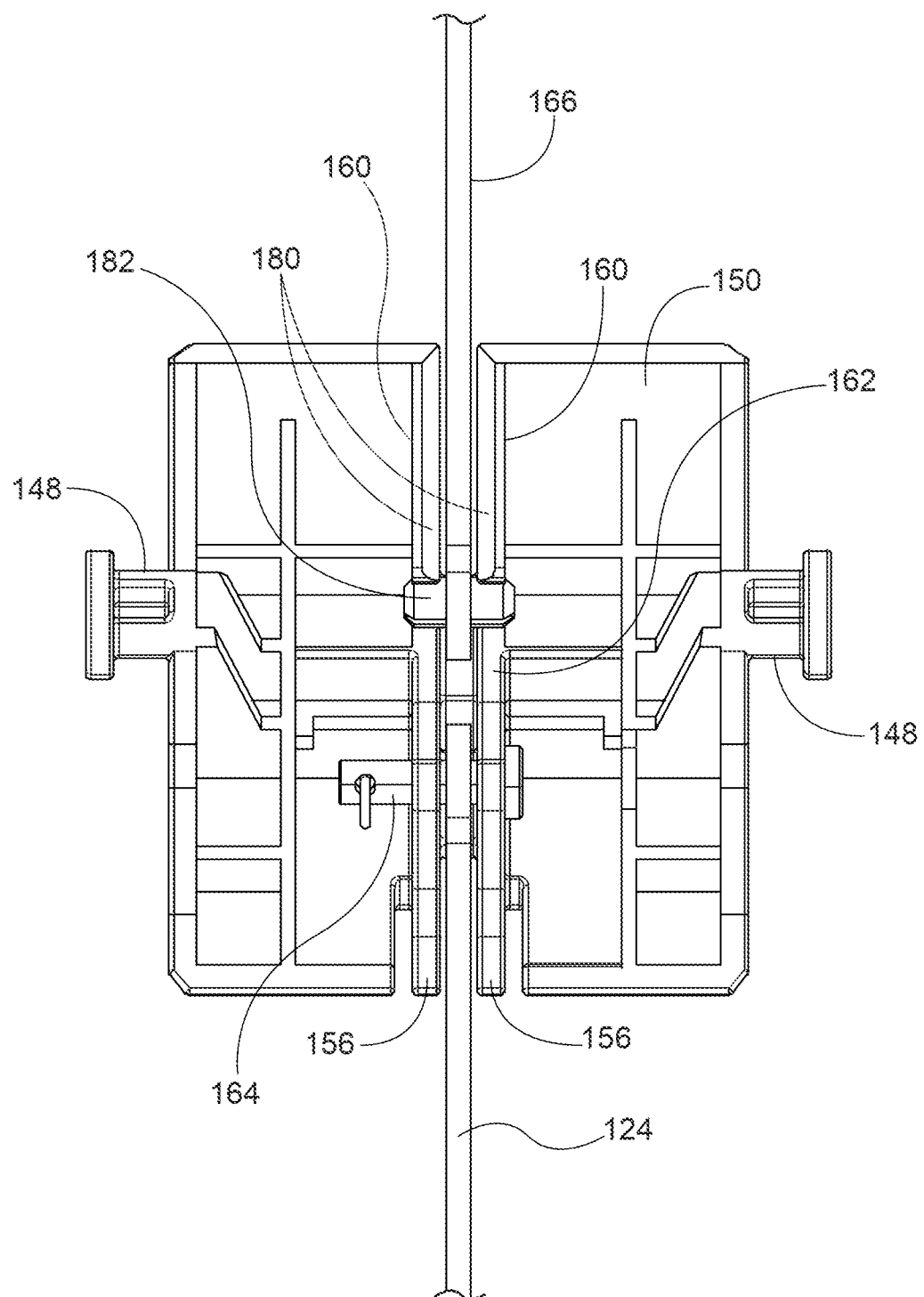
FIG. 7B is a detail view of certain components of an embodiment of the inventive actuator in an attached position.

In some embodiments, as the bolt 168 is rotated by the user via any commonly used tool, the threaded section 178 advances through the cross member 132, pulling the components of the extension assembly 102 (such as support member 176) against the components of the rack assembly 100. In other embodiments the bolt 168 is floating axially within the member 114 and so the extension assembly 102 may fully seat against assembly 100 without bolt 168 engaging the threads of cross member 132. The movement to seat extension assembly 102 against the assembly 100 also advances the catch pin 182 further along the sloped edges 180 of the catch mechanism 158 until at the time of full attachment, the catch pin passes over the upper ends of the sloped edges 180 and moves into the catch detent 162. At this position, shown in FIG. 6B, the linkage arm 166 is physically connected to the connector body 150 so that movement of the extension actuator 170 by a user will cause the connector body 150 to pivot, thus actuating the latch mechanism on the pivotal attachment 108. A view of the linkage arms 124 and 166 and the connector body 150 in this configuration, with other components removed for clarity, is depicted in FIG. 7B.

Figure 8A:
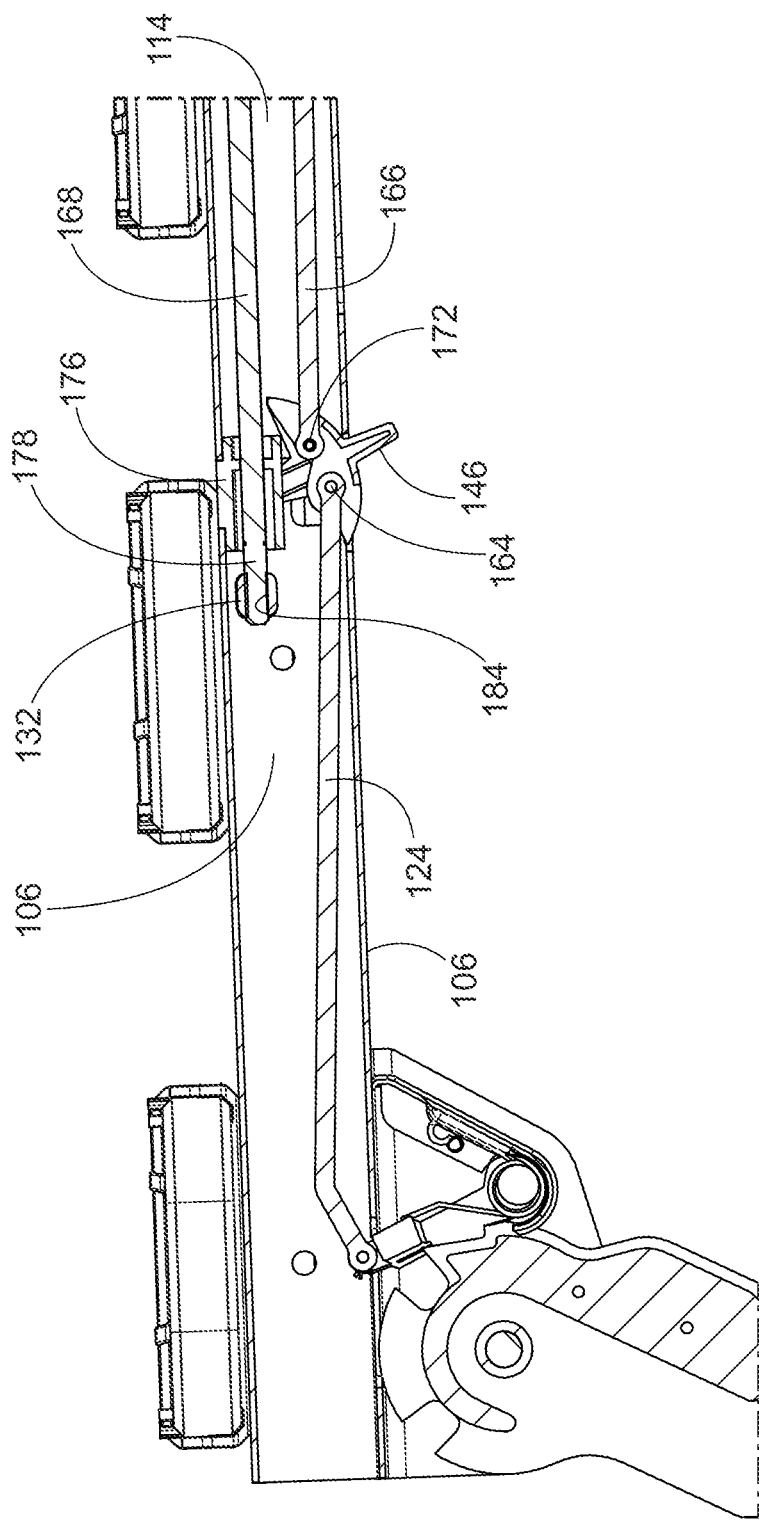
FIG. 8A is a cross-sectional view of an embodiment of a bicycle rack with the inventive actuator and a removeable extension assembly attached thereto with the inventive actuator in an unlatched position.
Figure 8B:
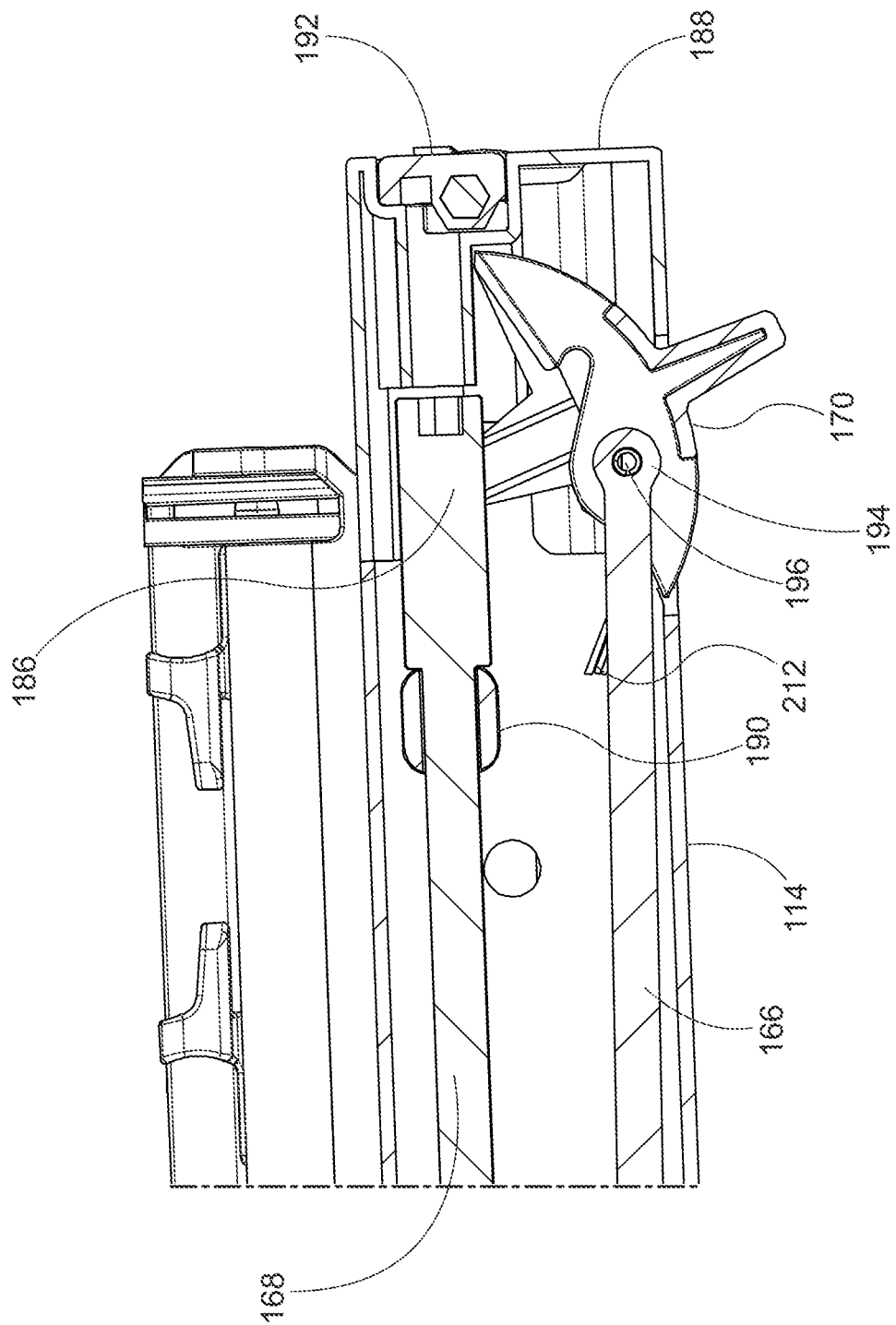
FIG. 8B is a cross-sectional view of a portion of an embodiment of a removable extension assembly with the inventive actuator.

FIGS. 8A and 8B depict cross-sectional views of the embodiment of the rack assembly 100 and extension assembly 102 in the attached configuration and with the actuator bodies 150 and 170 pivoted to the unlatched (or actuated) position. The pivotal movement of actuator body 170 to the position shown in FIG. 8B causes the linkage arm 166 to translate toward the distal end 120 of extension member 114. The linkage arm 166 in turn applies a translating force on the catch plates 160 thus causing connector body 150 to pivot to the depicted position. This pivoting movement causes the linkage 124 to translate distally thus releasing the latch mechanism in pivotal attachment 108. In other embodiments the actuator bodies 150 and 170 may translate linearly along the length of the assemblies 100 and 102, or transversely within the assemblies.

FIG. 8 also depicts an optional end cap 188 with storage for a tool 192 such as a hex head wrench or other similar tool for tightening a bolt. In this embodiment an aperture is provided to connect the tool with a hex socket provided in the head 186 of bolt 168 to allow a user to tighten it. Cross member 190 provides support to bolt 168 and allows it to rotate freely but is not threaded so that the bolt floats in the aperture. It also provides a structural member for the bolt head 186 to apply force to as it advances in the threaded aperture 184 in the cross member 132. In this embodiment the linkage arm 166 is attached at its distal end 194 to the actuator body 170 by a linkage pin 196.

When a user desires to remove the extension assembly 102 from the rack assembly 100, it is necessary to disengage the extension linkage arm 166 from the connector body 150. In some embodiments, such as that shown in FIG. 6B, an aperture 218 is provided at some point on the extension member 102 so that a user can reach in and push or pull the linkage arm 166 away from the connector body 150, overcoming the force of the biasing mechanism, and causing the catch pin 182 to disengage from the catch detent 162.

Figure 9A:
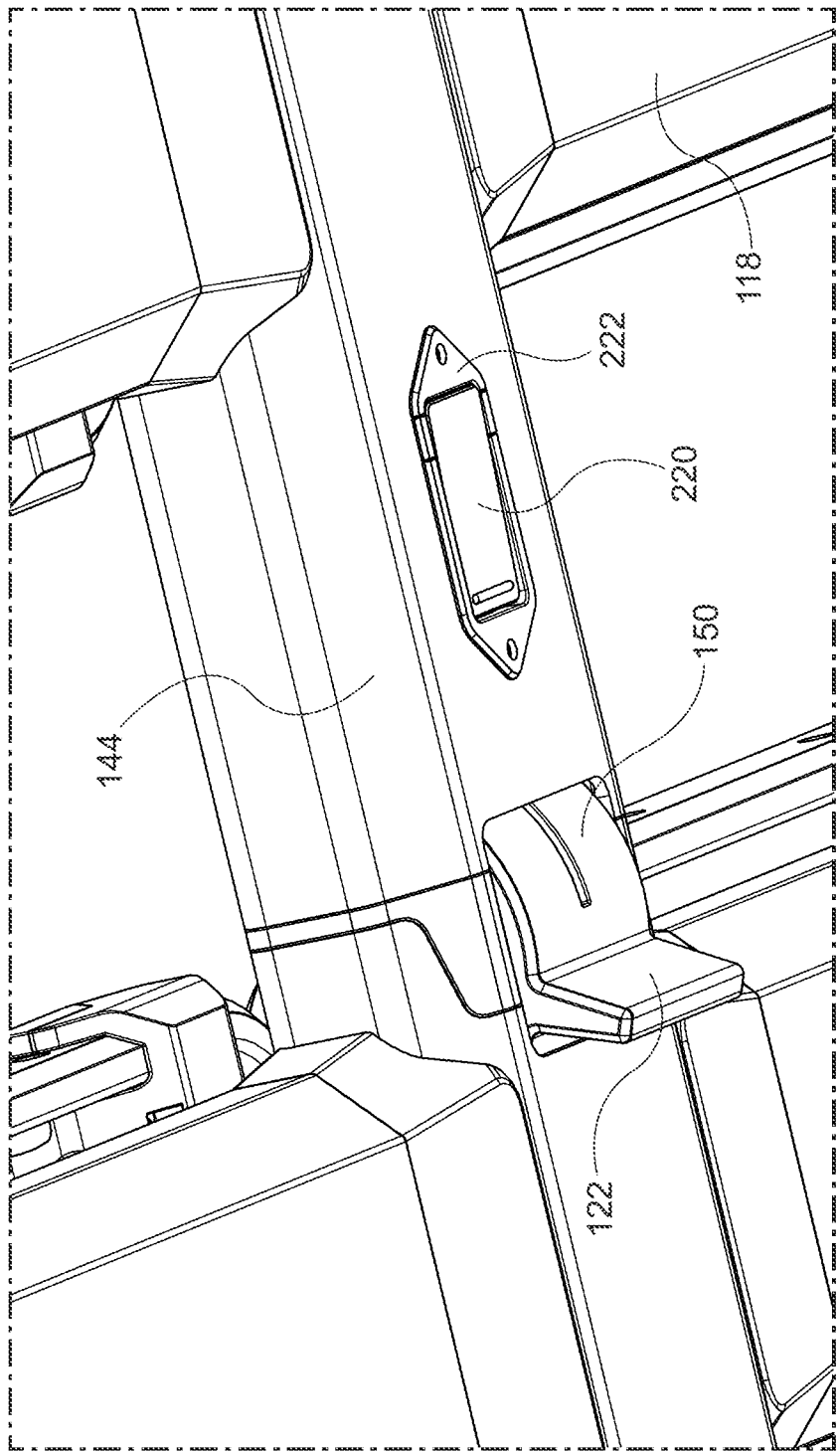
FIG. 9A is a detail, perspective view of a portion of an embodiment of a bicycle rack with the inventive actuator and a removable extension assembly attached thereto.
Figure 9B:
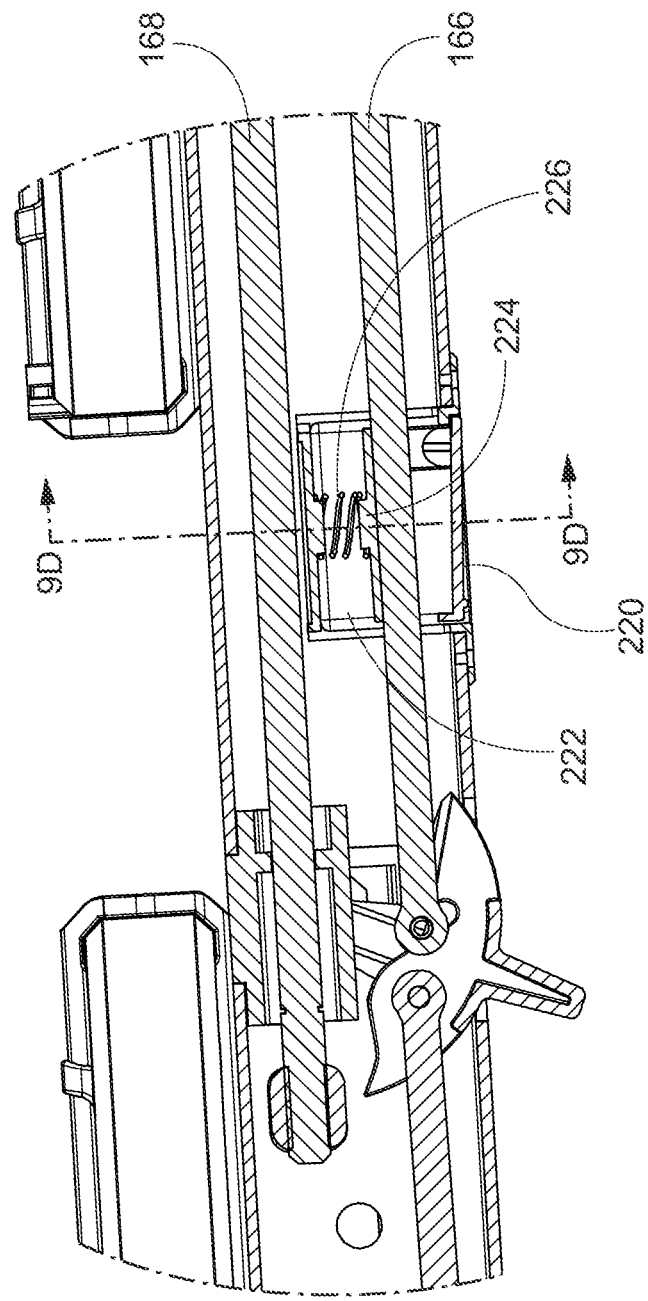
FIG. 9B is a cross-sectional view of a portion of an embodiment of a bicycle rack with the inventive actuator and a removable extension assembly attached thereto.

In another embodiment, depicted in FIGS. 9A, 9B, 9C, and 9D, a combined biasing and disengagement mechanism is provided in the extension assembly 102. FIG. 9A depicts the bottom of the connected rack and extension assemblies 100 and 102. A release or disengagement actuator 220 is provided in the aperture 218. The actuator 220 may be disposed in a housing 222. A user may disengage the linkage arm 166 from the connector body 150 by pressing inwardly on the release actuator 220. Referring now to FIG. 9B, a cross-sectional view of this embodiment of the biasing mechanism and disengagement mechanism is depicted. The housing 222 has walls that extend on both sides and the ends of the aperture 218, inwardly into the support member 114, and an upper surface that extends between the side and end walls. The end walls may be provided with slots or apertures for the linkage 166 to pass through and translated in during operation of the actuator mechanism. A spring plate 224 is slidably disposed in contact with the linkage arm 166, and an extension spring 226 applies the biasing force on the linkage arm 166 by pressure against the top plate of housing 222 and spring plate 224. In the position depicted in FIG. 9B, the biasing mechanism applies a force that will push catch pin 82 down into catch detent 162.

Figure 9C:
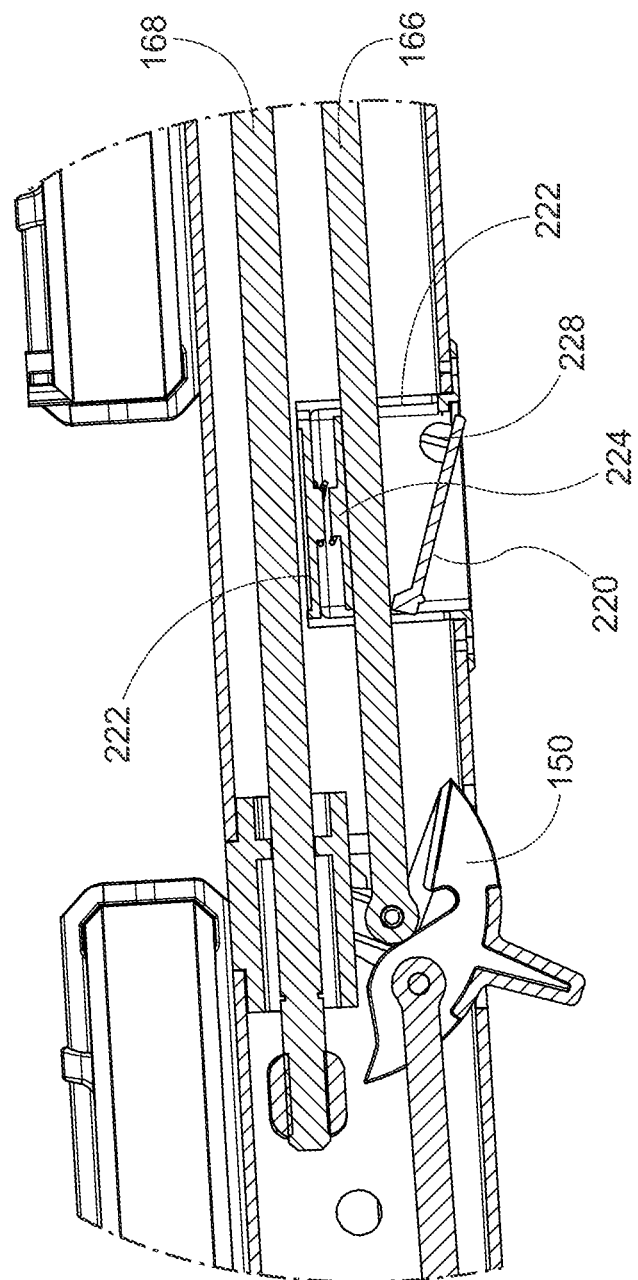
FIG. 9C is a cross-sectional view of a portion of an embodiment of a bicycle rack with the inventive actuator and a removable extension assembly attached thereto.

In this embodiment the release/disengagement actuator 220 is pivotally attached to the housing 222 by a pivotal attachment 228. This attachment 228 may consist of protrusions from the actuator 220 or from housing 220, or separate pins or brackets. When a user presses on the release actuator 220 it pivots as shown in FIG. 9C, pressing upwardly on the linkage arm 166, compressing the spring 226, and causing catch pin 182 to disengage from catch detent 162. This disengages the actuator mechanism so that the extension assembly 102 may be removed from rack assembly 100. In some embodiments the actuator 220 may be slidably attached to the housing 222 so that the entire actuator slides inwardly to force linkage arm 166 to disengage from the connector body 150.

FIG. 9D depicts a cross-sectional view along the axis 9D-9D shown in FIG. 9B. As can be seen from this figure, the spring plate 224 may have features that retain linkage arm 166 in a desired position within the housing 222. This may improve the ease of connecting the two assemblies 100 and 102 together by aiding in the alignment of the component parts as they are joined together.

Changes may be made in the above methods, devices and structures without departing from the scope hereof. Many different arrangements of the various components depicted, as well as components not shown, are possible without departing from the spirit and scope of the present invention. Embodiments of the present invention have been described with the intent to be illustrative and exemplary of the invention, rather than restrictive or limiting of the scope thereof. Alternative embodiments will become apparent to those skilled in the art that do not depart from its scope. Specific structural and functional details disclosed herein are not to be interpreted as limiting, but merely as a representative basis for teaching one of skill in the art to employ the present invention in any appropriately detailed structure. A skilled artisan may develop alternative means of implementing the aforementioned improvements without departing from the scope of the present invention.

It will be understood that certain features and subcombinations are of utility and may be employed without reference to other features and subcombinations and are contemplated within the scope of the claims. Not all steps listed in the various figures need be carried out in the specific order described.

The invention claimed is:

1. An equipment rack for a vehicle, the equipment rack having a base unit, a hub connecting the base unit to the vehicle and configured to position the base unit in a plurality of positions with respect to the vehicle, an extension unit configured to attach to the base unit, and an actuator mechanism comprising:
   a linkage arm operably connected to the hub;
   an actuator mounted on and movably attached to the extension unit; and
   an extension linkage arm operably connected to the actuator;
   wherein the extension linkage arm releasably engages the linkage arm when the extension unit is attached to the base unit.

2. The equipment rack for a vehicle of claim 1 wherein the linkage arm is disposed inside the base unit and the extension linkage arm is disposed inside the extension unit.

3. The equipment rack for a vehicle of claim 1 further comprising a release actuator disposed on the extension unit, the release actuator configured to release the extension linkage arm from the linkage arm.

4. The equipment rack for a vehicle of claim 1 further comprising a release actuator disposed on the base unit, the release actuator configured to release the extension linkage arm from the linkage arm.

5. The equipment rack for a vehicle of claim 1 further comprising a biasing mechanism configured to maintain the extension linkage arm in engagement with the linkage arm.

6. The equipment rack for a vehicle of claim 5 wherein the biasing mechanism comprises a spring configured to apply force on the extension linkage arm toward the linkage arm.

7. The equipment rack for a vehicle of claim 1 wherein the extension linkage arm is configured to automatically engage the linkage arm when the extension unit is attached to the base unit.

8. An equipment rack for a vehicle, the equipment rack having a base unit, a hub connecting the base unit to the vehicle and configured to position the base unit in a plurality of positions with respect to the vehicle, an extension unit configured to attach to the base unit, and an actuator mechanism comprising:
   a linkage arm operably connected to the hub;
   an actuator movably attached to the extension unit; and
   an extension linkage arm operably connected to the actuator and releasably connected to the linkage arm;
   a release actuator configured to disconnect the extension linkage arm from the linkage arm.

9. The equipment rack for a vehicle of claim 8 wherein the release actuator is disposed on the extension unit.

10. The equipment rack for a vehicle of claim 8 wherein the release actuator is disposed on the base unit.

11. The equipment rack for a vehicle of claim 8 further comprising a biasing mechanism configured to maintain the extension linkage arm in connection to the linkage arm.

* * * * *